(12) United States Patent
Isaacson et al.

(10) Patent No.: US 6,840,662 B2
(45) Date of Patent: Jan. 11, 2005

(54) ARCHITECTUAL STAR FIELD

(76) Inventors: Chris Isaacson, 365 1/2 Ocean View Ave., Encinitas, CA (US) 92024; Lisa Isaacson, 365 1/2 Ocean View Ave., Encinitas, CA (US) 92024

( * ) Notice: Subject to any disclaimer, the term of this patent is extended or adjusted under 35 U.S.C. 154(b) by 13 days.

(21) Appl. No.: 10/213,521

(22) Filed: Aug. 8, 2002

(65) Prior Publication Data
US 2004/0057251 A1 Mar. 25, 2004

(51) Int. Cl.[7] .............................................. F21V 7/04
(52) U.S. Cl. ...................... 362/555; 362/552; 362/554; 362/565; 362/576; 362/581
(58) Field of Search ................................ 362/552, 554, 362/555, 565, 576, 581; 385/117

(56) References Cited

U.S. PATENT DOCUMENTS

| | | | | |
|---|---|---|---|---|
| 4,953,848 A | * | 9/1990 | Braunstein et al. | 40/538 |
| 6,198,872 B1 | * | 3/2001 | Lipson et al. | 385/117 |
| 6,290,382 B1 | * | 9/2001 | Bourn et al. | 362/554 |
| 6,609,804 B2 | * | 8/2003 | Nolan et al. | 362/20 |

* cited by examiner

Primary Examiner—Stephen Husar
Assistant Examiner—James W Cranson
(74) Attorney, Agent, or Firm—Don E. Erickson

(57) ABSTRACT

A decorative dome with controlled light enhancement consisting of a substantially concave structure having opposed front and rear faces and a plurality of apertures extending therethrough, for receipt of a plurality of optical fibers, extending between the interior surface of the concave structure, to a plurality of light emitting diodes ("LEDs") mounted in a junction box mounted on the outer periphery of the rear face of the concave structure. The junction box also contains a control circuit for varying the duration and intensity of the plurality of LEDs, with the junction box constructed so as to dissipate heat generated by the LEDs. The LED's direct light into the receiving end of each said optical fibers such that light from the respective LEDs are directed through the optical fibers and from the emitting ends of the optical fibers at the front face of the concave structure. The plurality of apertures on the front face of the concave structure are arranged in a selected patent discernable by a viewer.

30 Claims, 9 Drawing Sheets

ARCHITECTUAL STAR FIELD

FIELD OF THE INVENTION

This invention relates to a concave structural dome that is located inside a larger structure, such as a house or a restaurant, and that simulates a cloudless night sky.

BACKGROUND OF THE INVENTION

Indoor structure that simulate outdoor environments are used, for example, in dioramas, theaters, and planetaria. Such structures used in dioramas and theaters typically involve ceilings painted either blue to simulate daylight sky or black with painted stars to simulate night sky. Such structures used in planetaria typically include extremely elaborate optical equipment used to project star patterns on a concave surface from a projector located in the same room as the concave surface for the benefit of an audience located in the same room as the concave surface. The former types of structures, however, are not very realistic, and the latter type of structure is extremely expensive. U.S. Pat. No. 4,953,848 to Braunstein describes and claims an indoor structure that simulates an outdoor environment wherein an apparatus for providing an illusion of either a daytime or a nighttime sky in an indoor structure consisting of at least one transparent window that appears to be a window to the outside. The room has a ceiling that slants from a high end at or adjacent the front wall to a low end removed from the front wall, the ceiling having an aperture in it, with a concave dome on the outside of the ceiling covering the aperture. The inside surface of the concave dome is light reflecting. Means is provided for shining light of appropriate colors colors on the eflecting, inside surface of the concave dome. The source of the light is concealed from a viewer located on the outside of the front wall.

U.S. Pat. No. 6,498,872 to Lipson et al. describes a planar advertising display or point-of-purchase display having portions that are selectively illuminable. The display includes an electronic circuit assembly capable of distributing current to each of a plurality of loads pursuant to a pre-programmed sequence. The electronic circuit assembly may include a pre-programmed or programmable integrated circuit chip or a microprocessor that is programmed to sequentially direct electrical current to each of a plurality of electrically conductive wires. The integrated circuit chip and other components on the circuit board may function as an array of solid state switches for alternately permitting or interrupting the flow of current from a power source to each of a plurality of electrically conductive wires. The display further includes a plurality of light emitting diodes that are connected respectively to ends of the electrically conductive wires remote from the circuit board. Thus, current from the wires will selectively activate the light emitting diodes and thereby cause pulses of light to be generated in accordance with a pattern that is dictated by the programmed or programmable components of the circuitry. However, recent studies of LEDs as shown that configurations such as that described in Lipson et al. cause a degradation of the LEDs due to the internal heat generated by such devices, and that the life span of the LEDs are significantly reduced.

The instant invention describes a configuration and wiring system that overcomes the problems of the prior art and produces a decorative dome with controlled light enhancement that provides an asthetic appearance and technology that extends the life span of the LEDs. Neither of the above-described patents provide an apparatus for installation in a home, restaurant or other structure that realistically simulates a nighttime sky.

OBJECTS OF THE INVENTION

It is a principal object of the invention to provide a simple, inexpensive indoor apparatus that provides a very realistic simulation of a nighttime sky. It is a further object of the invention to provide an apparatus that provides such realistic simulation without need for any windows or reflective means.

SUMMARY OF THE INVENTION

The inventor has discovered an apparatus for creating a nighttime sky in a house, restaurant or other structure consisting of a concave dome that may be installed in the structure, and that provides for a means of simulating any selected light pattern on the internal surface of the dome. The light system, consisting of an array of light emitting diodes (LED) and fiber optics, is completely hidden from a viewer located in the structure. The apparatus includes means for dissipating heat generated by the LEDs.

DETAILED DESCRIPTION OF THE PREFERRED EMBODIMENT

Figure 1:
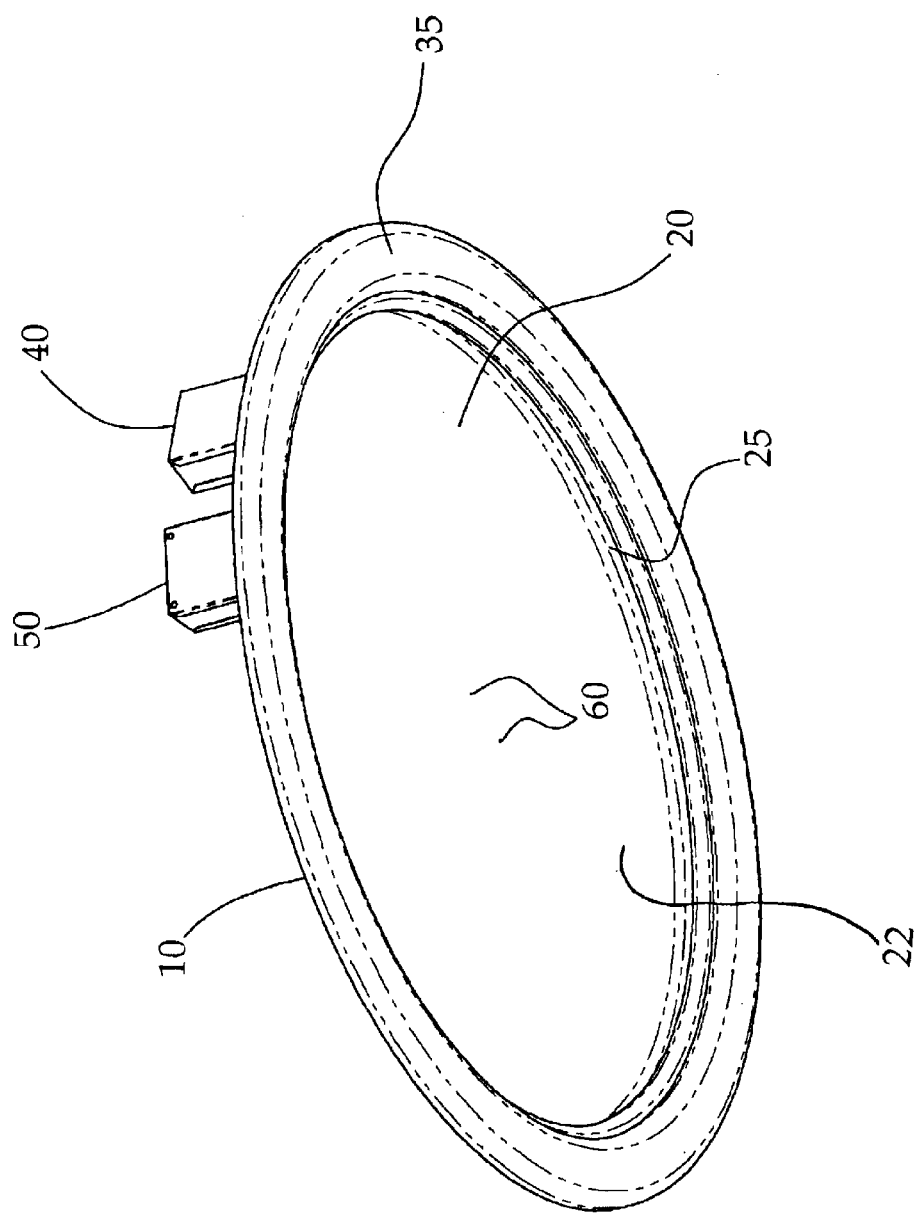
FIG. 1 is a bottom perspective view of the dome of the invention showing the internal surface of the dome as seen by a viewer.
Figure 2:
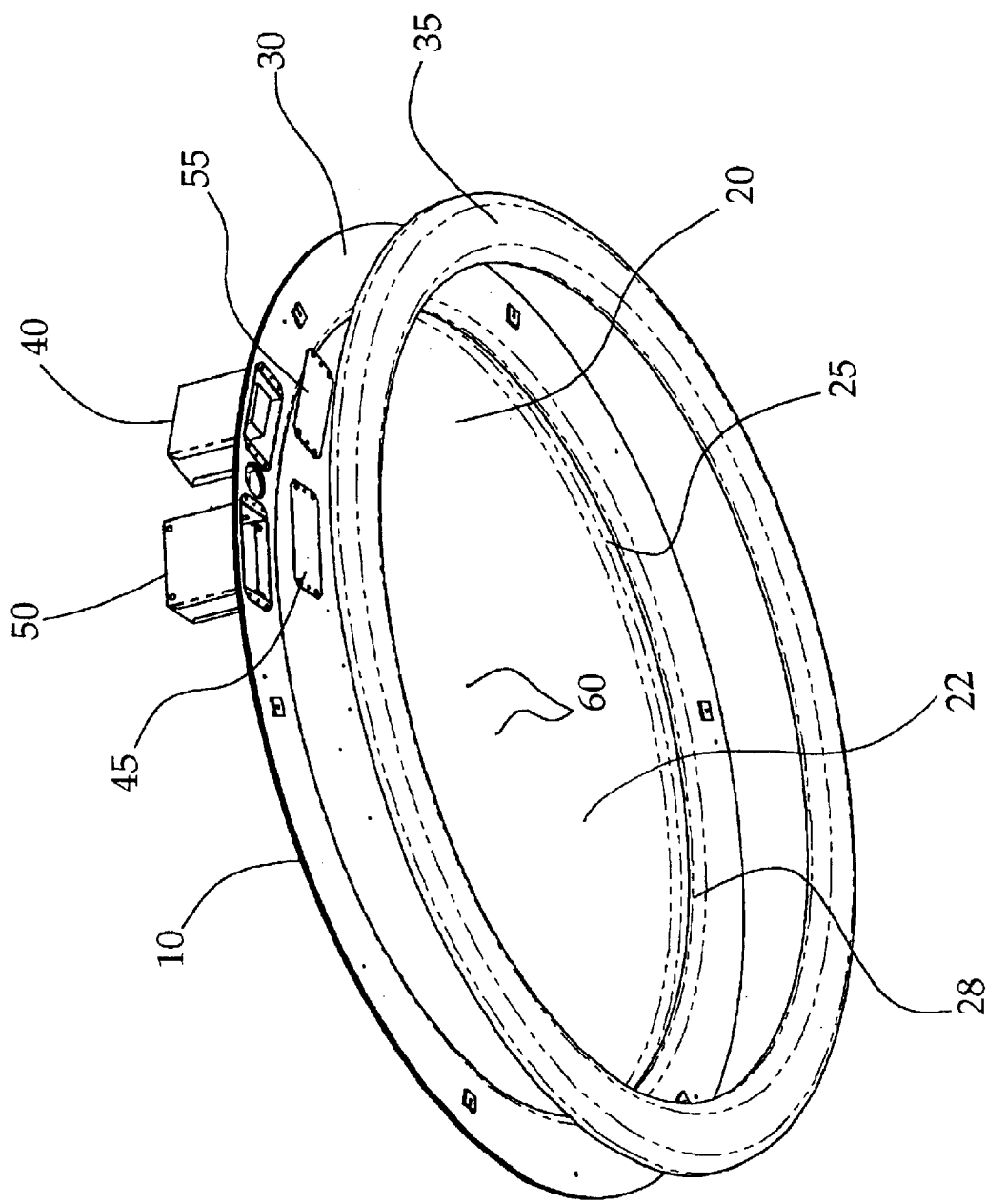
FIG. 2 is a bottom perspective view of the dome of the invention having the decorative flange displaced from the main dome section.
Figure 3:
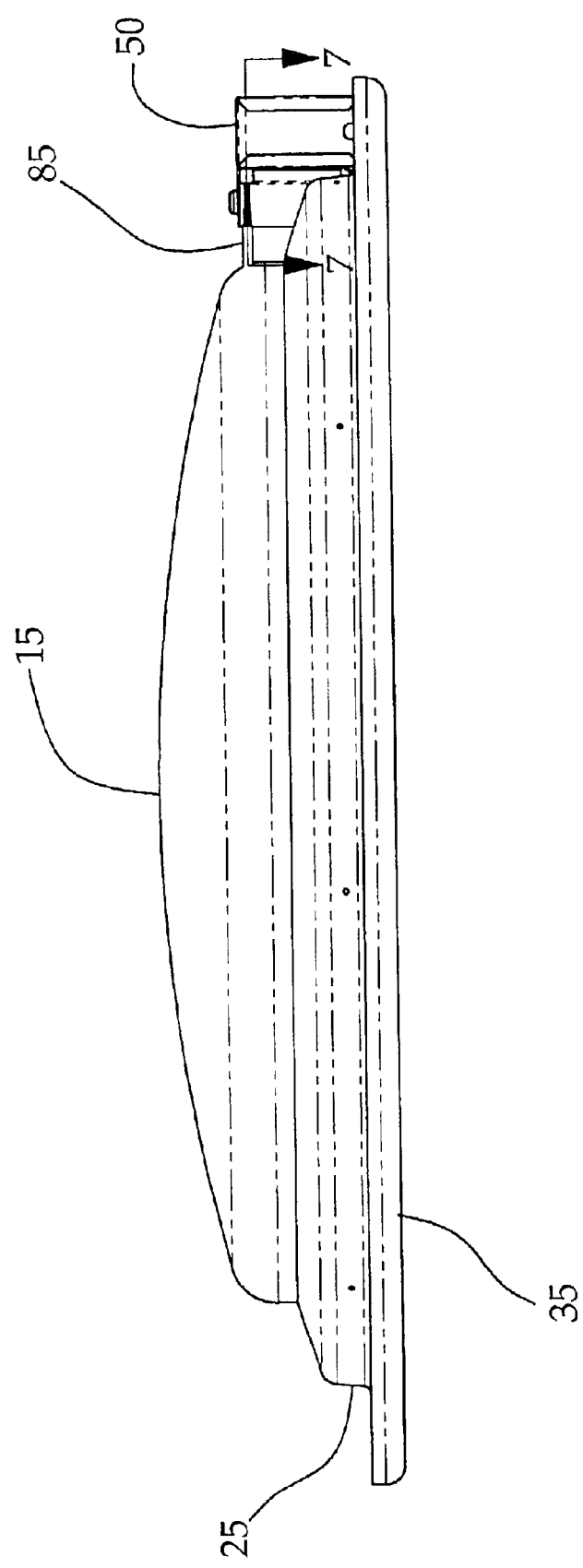
FIG. 3 is a side elevation of the dome of the invention.
Figure 4:
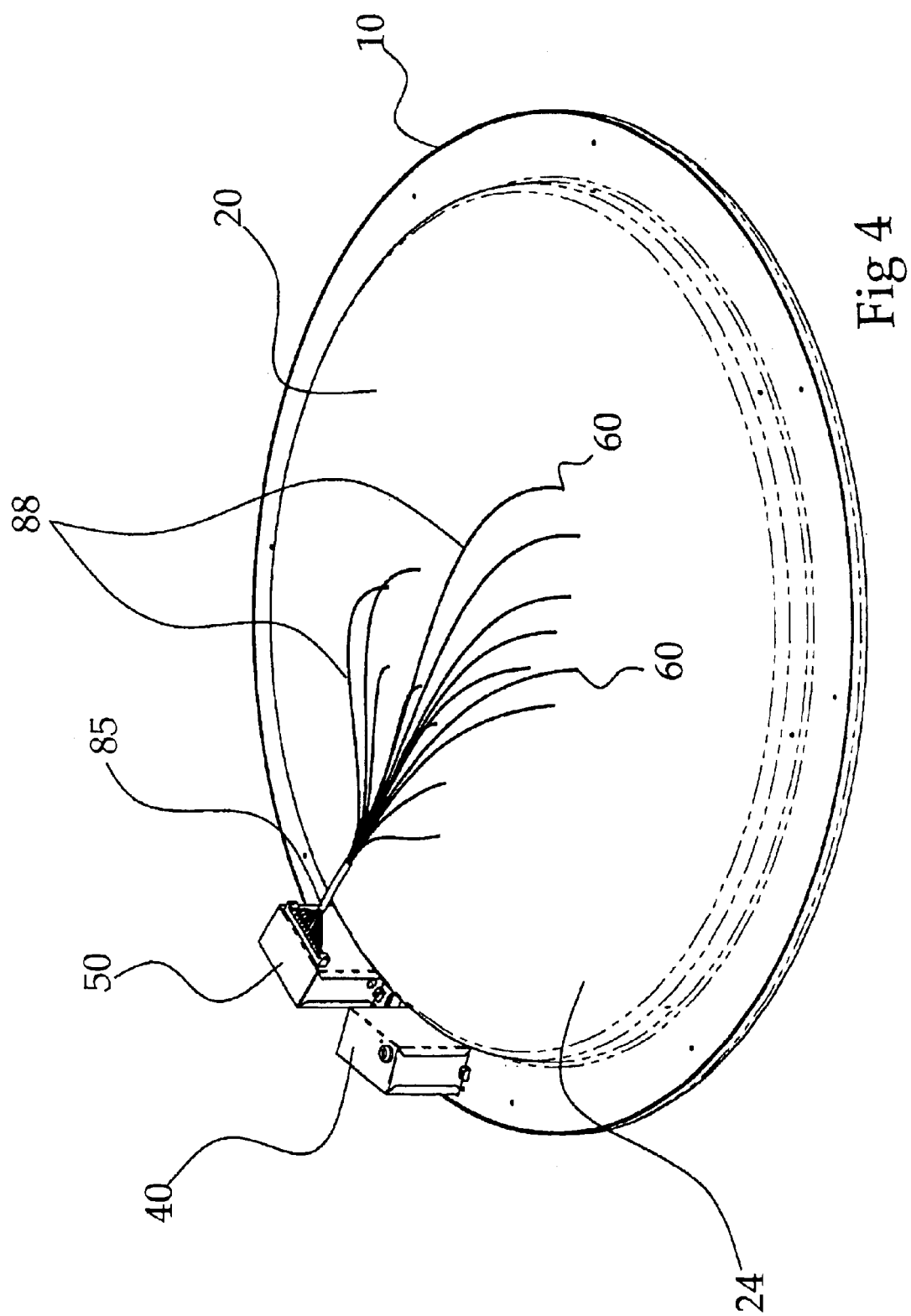
FIG. 4 is a top perspective view of the dome of the invention showing distribution of the fiber optics.
Figure 5:
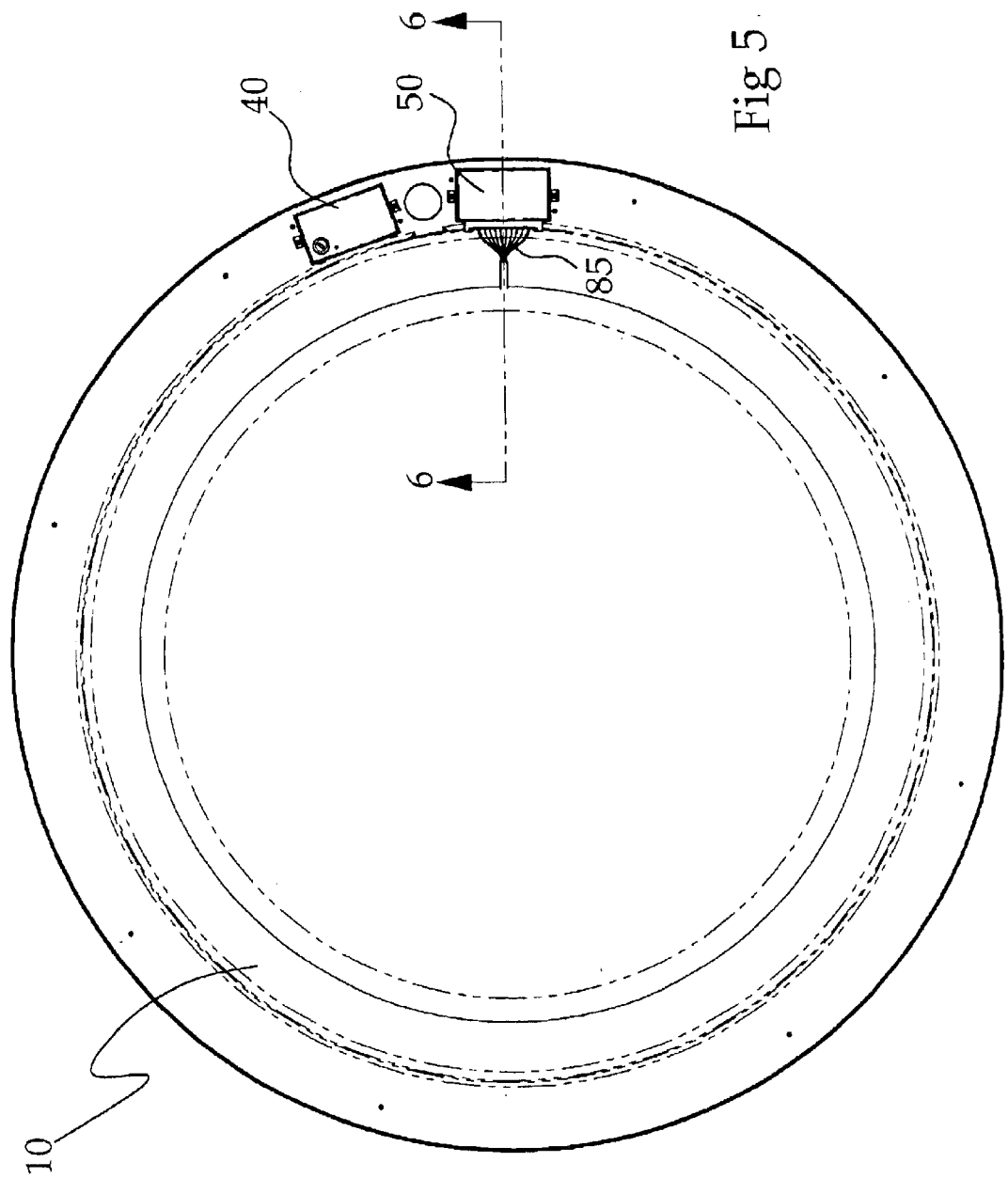
FIG. 5 is a top view of the dome of the invention.

FIGS. 1 and 2 show a dome of the preferred embodiment of the invention, consisting of a dome 10 having a concave dome section 20 having an inner surface 22, a skirt 25, an outer rim 30, and a decorative cover 35. Mounted on the upper surface of outer rim 30 are power junction box 40 and circuitry junction box 50. On the inner surface 22 is shown a plurality of holes 60 for receiving fiber optic strands 88. FIG. 3 is a side view of dome 10 further demonstrating the geometric configuration of the dome, and including fiber optic system 85 exiting circuitry junction box 50. FIG. 4 is a perspective view of the upper, outer surface of concave dome section 20. Fiber optic system 85 is comprised of plurality of fiber optic bundles and strands 88 which are distributed over the outer surface 24, inserted in holes 60 so that the tip of the fiber optic strands 88 are substantially flush with the inner surface 22 of the dome 10, and such that fiber optic strands 88 may slightly recede or protrude in holes 60. Included within the internal periphery of dome section 20, an adjacent skirt 25, is soffit 28 (FIG. 2), formed to receive light source 29 for indirectly lighting the internal surface 22. In this preferred embodiment light source 29 is a flexible linear light source commonly known as a "rope light," which is known to those of ordinary skill in the art, and which may be obtained from a variety of sources, on of which is American Lighting, Inc., which sells a rope light identified as MDL/DL30. The light source is not limited to a rope light, but could alternatively be any manner of light source, including, but not limited to an individual light, light strings, or combination thereof, with light generated by filament, neon, or equivalent. In this referred embodiment, the outer surface 24 of the dome and the distributed fiber optic strands 88 are covered by protective surface 15 consisting of a foam material such as polyurethane, or similar non-flammable construction-rated UL 94 material. It should be noted that protective surface 15 serves to protect the fiber strands 88 from displacement and damage, but is not a limitation of the invention. Alternatively, protective surface 15 could be comprised of molded plastic material.

Fiber optic bundles 85 may each consist of either a plurality of fiber optic strands, single fiber optic strands, or a combination thereof. One of ordinary skill in the art would know that fiber optic strands 88 are commercially available from several sources, and are known for use with LEDs. Such fiber optic strands 88 may be flexible light pipes as are available from BivarOpto™, sold as FLP Series, an equivalents. In this preferred embodiment, dome 10 is formed of a fiberglass material, and through holes 60 are drilled through the fiberglass. However dome 10 could also be fabricated using any common method such as by vacuum or pressure forming plastic or other equivalent material and whereby holes 60 may be formed as part of the fabrication process. Through holes 60 may be formed in any desired pattern. In this preferred embodiment, the hole pattern describes the stars of the midnight sky, however, any desired pattern may be select. It can be seen in FIG. 1 that the hole patterns describe the Big and Little Dippers. Once the fiber optic strands are inserted in the holes 60 they are secured in place with an adhesive, and the dome is covered with a protective coating to maintain the strand 88 in place and to prevent the dislodgment of the strands during installation and use.

Power receptacle, electrical junction box 40 receives standard 115-volt alternating current from the electrical wiring system of the structure, and converts it to a selected low voltage direct current supplied to circuitry housing, junction box 50. Mounted on junction box 50 is a plurality of snap-in panel mounts 56 for circuit board 58 with the LEDs. As noted above, LEDs generate a measurable amount of heat, which if not dissipated, causes degeneration in the life cycle of the LED. The specially designed multi-LED coupler 55 aligns the LEDs to the fiber optic bundles, and serves an additional function as a heat sink. Light pipes are known in the illumination and electronics industries for transmitting light from LEDs to a panel. As known by those of ordinary skill in the art the LEDs are commonly available from various sources, such as the Oriol DED Dice, (OS450, OS460, etc.) having a typical forward voltage of 3.5 volts at 20 milliamps, a peak wave length of 444 at 20 milliamps and a reverse current of 50 milliamps at 5 volts. The LEDs are typically 5 mm (T 1¾).

Figure 6:
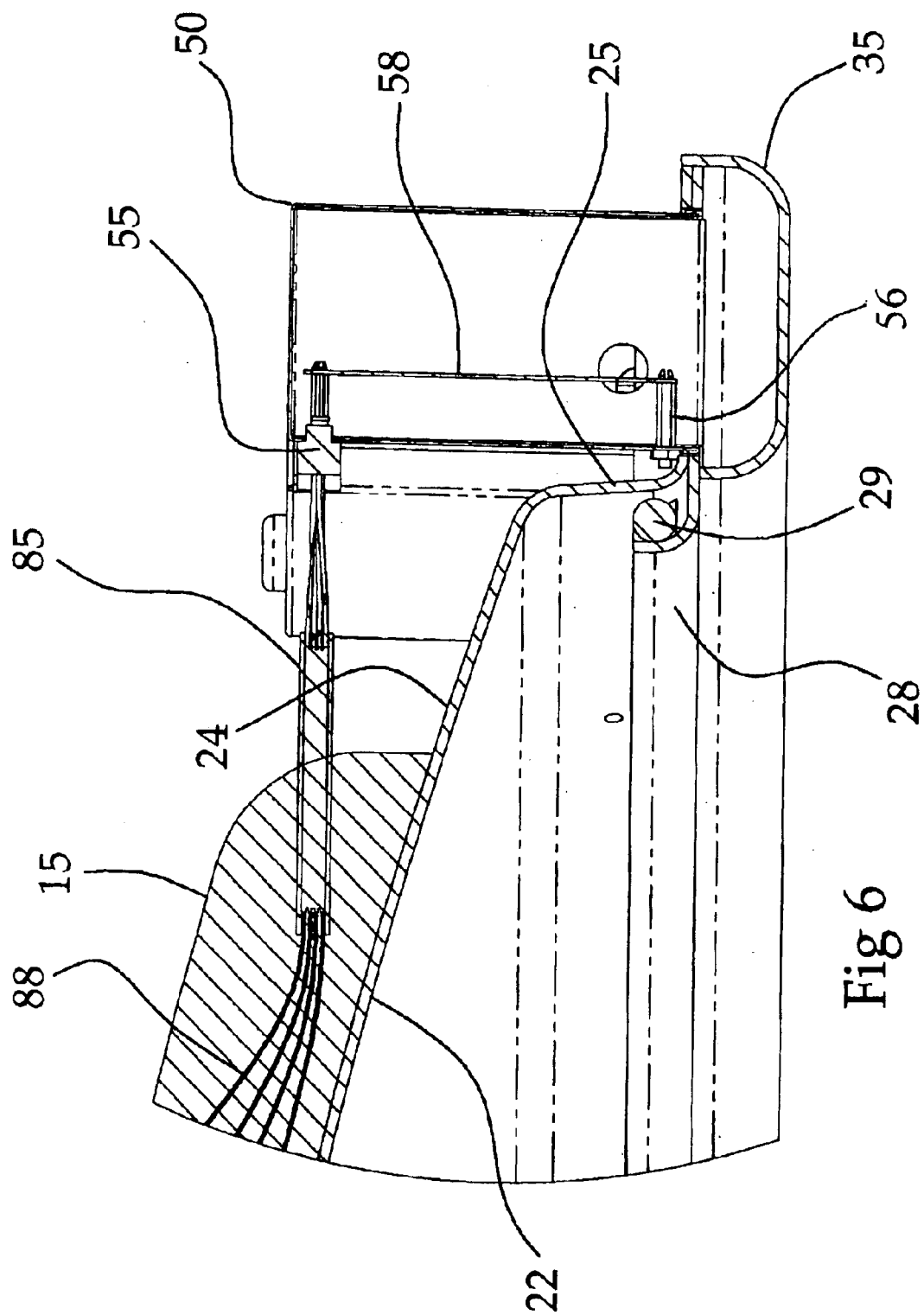
FIG. 6 is a side sectional view of the dome showing the interior of the housing for the circuit board and LEDs of the invention.
Figure 7:
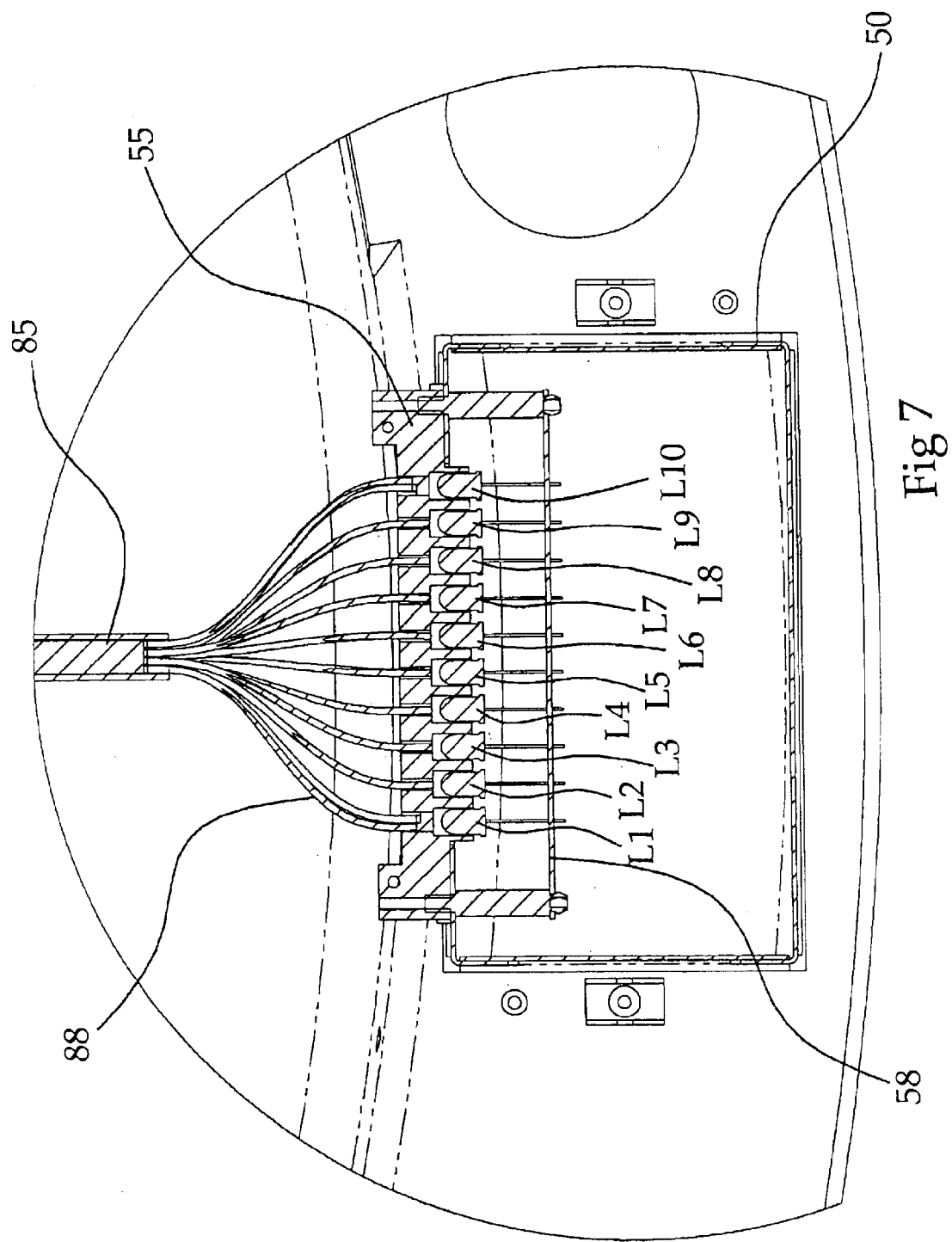
FIG. 7 is a top sectional view of the housing showing the LEDs and the circuit board.
Figure 8:
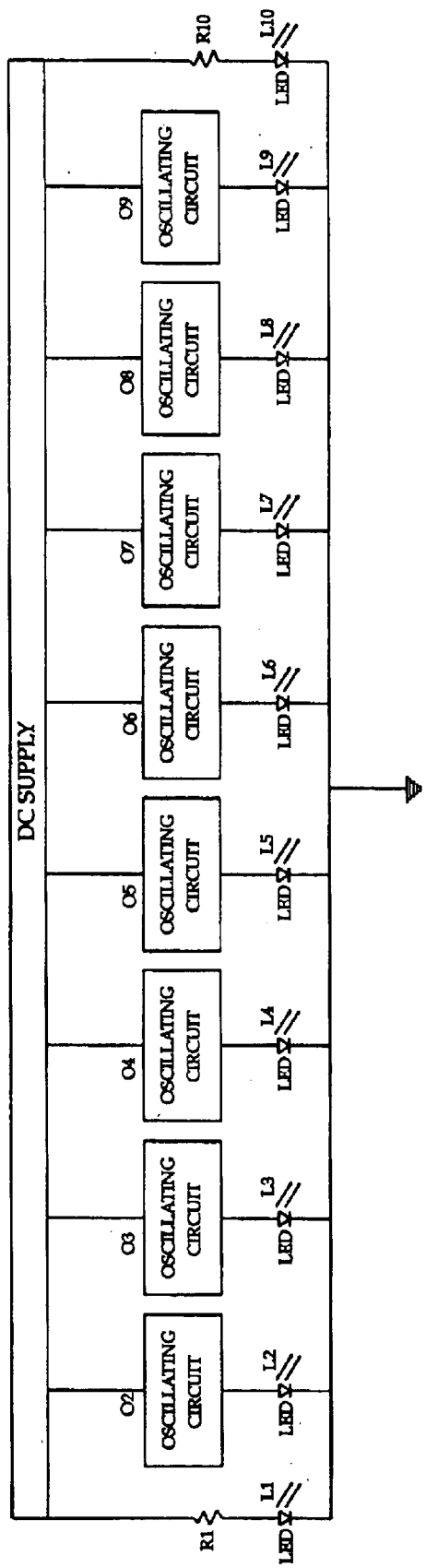
FIG. 8 is a schematic of the light generating system of the dome of the invention.
Figure 9:
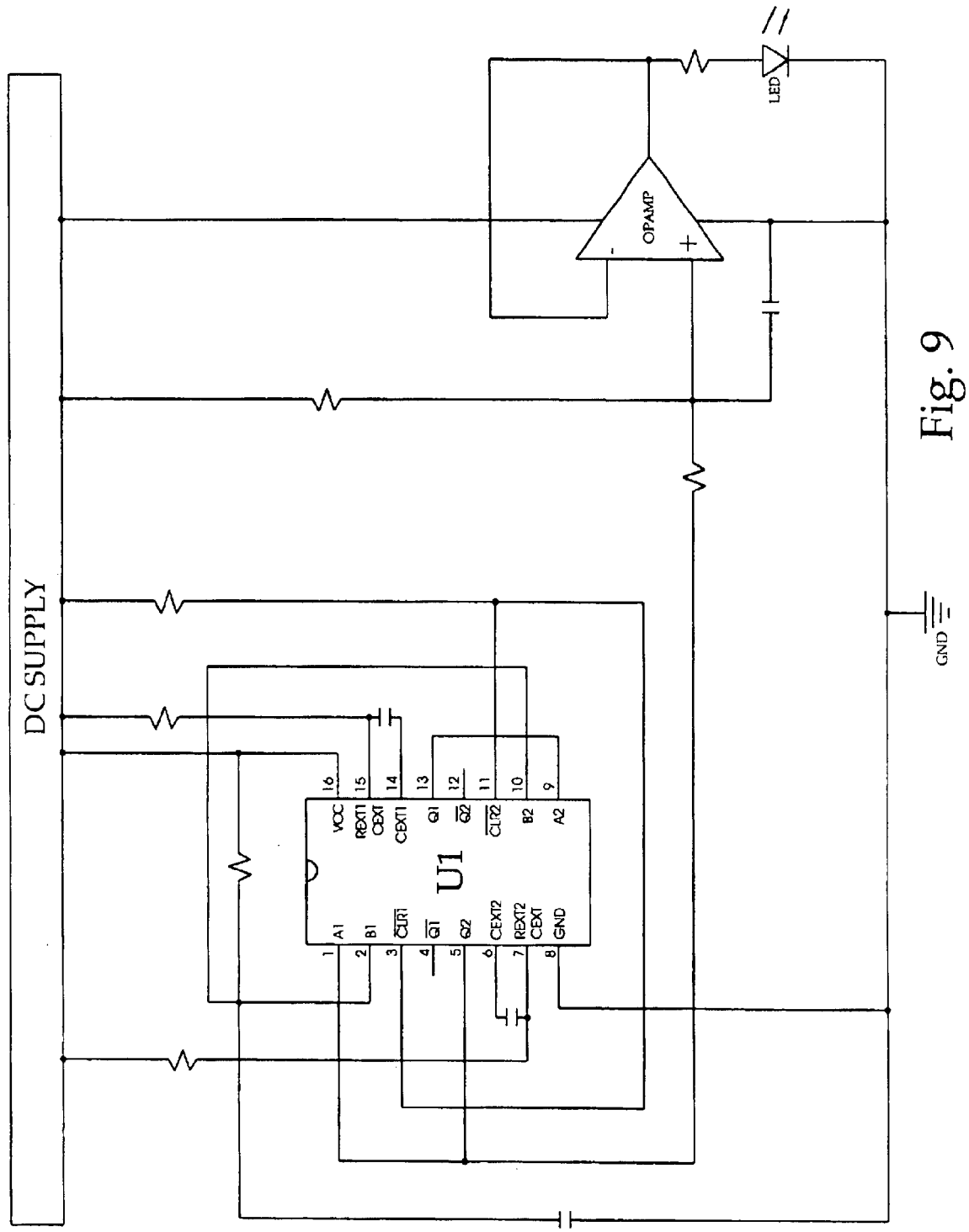
FIG. 9 is a schematic of the individual oscillation circuits of the light generating system.

FIG. 6 shows a cross-sectional view of junction box 50 in which is mounted coupler 55 and circuit board 58. LEDs L1 through 10 are mounted on coupler 55, which couples the LEDs to fiber optic bundles 85, and which, as noted above, also serves as a heat sink for the purpose of dissipating heat from the LEDs. Circuit board 58 contains the circuitry controlling the intensity of the light emitted by L1 and L10, and oscillating circuits O2–O9 for controlling the intensity of the light emitted from LEDs L2 through L9. FIG. 8 is a schematic of the light controlling circuitry, which depicts a parallel oscillating circuits O2–O9, each in series with an LED L2–L9. In parallel with the oscillating circuits O2–O9 are LEDs L1 and L10, each having a load resister in series. Each of the fiber optic bundles 85 abut with the output light port of its respective LED. FIG. 9 is a schematic drawing of each of the oscillating circuits O2–O9 and their respective, LEDs L2–L9, wherein U1 is a dual retriggerable, monostable multivibrator. Experimentation has revealed that such circuits can be made to oscillate, and can be wired or configured to cause differing light intensity at a selected, predetermined periodicity. Thus, when power is applied to the circuits, light output from LEDs L1 and L10 would be constant, while the light output from LEDs L2–L9 would oscillate between two levels of intensity, providing controlled light enhancement. Thus, when dome 10 is installed in the ceiling of a room, such as a bathroom or atrium, with inner surface 22 painted a dark blue or black, and power applied, the dome would appear to be the night sky, with light from the major, closer stars and planets to be constant, and the light from th distant stars to be wavering, or "twinkling."

Obviously, numerous modifications and variations of the present invention are possible in light of the above teachings. While the present description contains much specificity, this should not be construed as limitations on the scope of the invention, but rather as examples of some preferred embodiments thereof. Accordingly, the scope of the invention should not be determined by the specific embodiments illustrated herein. The full scope of the invention is further illustrated by the claims appended hereto.

What is claimed is:

1. A decorative dome with controlled light enhancement comprising:
    (a) a substantially concave structure having an inner surface, an outer surface, and a plurality of apertures extending therethrough, the substantially concave structure having a periphery of a selected geometry;
    (b) a plurality of optical fibers, each said optical fiber having an emitting end and a receiving end, the emitting ends of the optical fibers mounted in the respective apertures, the receiving ends of the optical fibers spanning to a housing, mounted on the periphery of the concave structure, the housing for receiving a control circuit and a plurality of LEDs;
    (c) a control circuit for generating an oscillating sequence of signals for controlling the intensity of illumination of at least one of the LED's between at least two positive levels of illumination; and
    (d) the plurality of LED's arranged such that each LED is juxtaposed adjacent to the receiving end of at least one optical fiber such that the LED's direct light into the receiving end of each said optical fiber connected thereto and such that light from the respective light emitting diodes are directed through the optical fibers and from the emitting ends of the optical fibers at the inner surface of the concave structure.

2. The decorative dome of claim 1, wherein at least one said LED is in juxtaposed relationship to the receiving ends of a plurality of optical fibers.

3. The decorative dome of claim 1, wherein the emitting end of the optical fibers is substantially flush with the inner surface of the concave structure.

4. The decorative dome of claim 1 additionally comprising a first electrical junction box for housing a converter for converting standard house current to low power direct current, the low power direct current for supplying electrical power to the LEDs, the first electrical junction box mounted on the outer periphery of the outer surface of the concave structure.

5. The decorative dome or claim 1, wherein the housing for the control circuit and the LEDs is a junction box mounted on the outer periphery of the outer surface of the concave structure.

6. The decorative dome of claim 4, wherein the junction box is constructed so as to dissipate heat from the LEDs.

7. The decorative dome o claim 4, additionally comprising a planar flange cover having a selected width and periphery selected to match the periphery of the concave structure, the planar flange cover for concealing the junction box mounted on the concave structure.

8. The decorative dome of claim 1, wherein the periphery of the concave structure is circular.

9. The decorative dome of claim 1, wherein the periphery of the concave structure is oval.

10. The decorative dome of claim 1, wherein the periphery of the concave structure is rectangular.

11. The decorative dome of claim 1 additionally comprising a protective cover for protecting the fiber optics on the outer surface of the concave structure.

12. The decorative dome of claim 1, wherein protective cover for protecting the fiber optics on the outer surface of the concave structure is polyurethane insulation.

13. The decorative dome of claim 1 additionally comprising a soffit for receiving a formable linear light source for indirectly illuminating the inner surface of the concave structure.

14. A decorative dome with controlled light enhancement comprising:
  (a) a substantially concave structure having an inner surface, an outer surface, and a plurality of apertures extending therethrough, the substantially concave structure having a periphery of a selected geometry;
  (b) a plurality of optical fibers, each said optical fiber having an emitting end and a receiving end, the emitting ends of the optical fibers mounted in the respective apertures and the receiving ends of the optical fibers spanning to a housing, mounted on the periphery of the concave structure, for receiving a control circuit and a plurality of LEDs;
  (c) a control circuit for generating an oscillating sequence of signals for controlling the intensity of illumination at least one of the LED's between at least two positive levels of illumination;
  (d) the plurality of LED's arranged such that each LED is juxtaposed adjacent to the receiving end of at least one optical fiber; and wherein at least one said LED is in juxtaposed relationship to the receiving ends of a plurality of optical fibers such that the LED's direct light into the receiving end of each said optical fiber connected thereto, and such that light from the respective light emitting diode are directed through the optical fibers and from the emitting ends of the optical fibers at the inner surface of the concave structure; and
  (e) an electrical junction box for housing a converter for converting standard house current to low power direct current, the low power direct current for supplying electrical power to the LEDs, the electrical junction box mounted on the outer periphery of the outer surface of the concave structure.

15. The decorative dome of claim 14, wherein the emitting end of the optical fibers are substantially flush with the inner surface of the concave structure.

16. The decorative dome of claim 14, wherein the housing for the control circuit and the LEDs is a junction box on mounted on the outer periphery of the outer surface of the concave structure.

17. The decorative dome of claim 16, wherein the junction box is constructed so as to dissipate heat from the LEDs.

18. The decorative dome of claim 16, additionally comprising a planar flange cover having a selected width and periphery selected to match the periphery of the concave structure, the planar flange for concealing the junction box mounted on the concave structure.

19. The decorative dome of claim 14, wherein the periphery of the concave structure is circular.

20. The decorative dome of claim 14, wherein the periphery of the concave structure is oval.

21. The decorative dome of claim 14, wherein the periphery of the concave structure is rectangular.

22. The decorative dome of claim 14 additionally comprising a protective cover for protecting the fiber optics on the outer surface of the concave structure.

23. The decorative dome of claim 22, wherein protective cover for protecting the fiber optics on the outer surface of the concave structure is polyurethane insulation.

24. The decorative dome of claim 14 additionally comprising a soffit for receiving a formable linear light source for indirectly illuminating the inner surface of the concave structure.

25. A decorative dome with controlled light enhancement comprising:
  (a) a substantially concave structure having an inner surface, an outer surface, and a plurality of apertures extending therethrough, the substantially concave structure having a periphery of a selected geometry;
  (b) a plurality of optical fibers, each said optical fiber having an emitting end and a receiving end, the emitting ends of the optical fibers mounted in the respective apertures such that the emitting ends of the optical fibers are flush with the inner surface of the concave structure, the receiving ends of the optical fibers spanning to a junction box mounted on the outer periphery of the outer surface of the concave structure;
  (c) the junction box for receiving a control circuit and a pluralilty of LEDs, the junction box constructed so as to dissipate heat from the LEDs;
  (d) the control circuit for generating an oscillating sequence of signals for controlling the intensity of at least one of illumination of the LED's between at least two positive levels of illumination;
  (d) the plurality of LED's arranged such that each LED is juxtaposed adjacent to the receiving end of at least one optical fiber; and wherein at least one said LED is in juxtaposed relationship to the receiving ends of a plurality of optical fibers such that the LED's direct light into the receiving end of each said optical fiber connected thereto, and such that light from the respective LEDs are directed through the optical fibers and from the emitting ends of the optical fibers at the inner surface of the concave structure;
  (e) an electrical junction box for housing a converter for converting standard house current to low power direct current, the low power direct current for supplying electrical power to the LEDs, the electrical junction box mounted on the outer periphery of the outer surface of the concave structure;
  (f) a flange cover having a selected width and periphery selected to match the periphery of the concave structure, the flange cover for concealing junction boxes mounted on the concave structure; and (g) a protective cover for protecting the fiber optics on the outer surface of the concave structure.

26. The decorative dome of claim 25, wherein the periphery of the concave structure is circular.

27. The decorative dome of claim 25, wherein the periphery of the concave structure is oval.

28. The decorative dome of claim 25, wherein the periphery of the concave structure is rectangular.

29. The decorative dome of claim 25, wherein protective cover for protecting the fiber optics on the outer surface of the concave structure is polyurethane insulation.

30. The decorative dome of claim 25 additionally comprising a soffit for receiving a formable linear light source for indirectly illuminating the inner surface of the concave structure.

* * * * *